United States Patent [19]

Fujita

[11] Patent Number: 5,385,993
[45] Date of Patent: Jan. 31, 1995

[54] PRODUCTION OF OLEFIN POLYMERS

[75] Inventor: Takashi Fujita, Yokkaichi, Japan

[73] Assignee: Mitsubishi Petrochemical Company Limited, Tokyo, Japan

[21] Appl. No.: 136,732

[22] Filed: Oct. 14, 1993

Related U.S. Application Data

[63] Continuation of Ser. No. 842,631, Feb. 27, 1992, abandoned.

[30] Foreign Application Priority Data

Feb. 27, 1991 [JP] Japan .................. 3-033107

[51] Int. Cl.⁶ .................. C08F 4/654; C08F 10/06
[52] U.S. Cl. .................. 526/119; 502/125; 526/124; 526/125; 526/351
[58] Field of Search .................. 526/119, 124, 125

[56] References Cited

U.S. PATENT DOCUMENTS

| | | | |
|---|---|---|---|
| 4,297,465 | 10/1981 | Smith .................. | 526/351 |
| 4,442,276 | 4/1984 | Kashiwa et al. .................. | 526/351 |
| 4,780,443 | 10/1988 | Matsuura et al. . | |
| 4,870,043 | 9/1989 | Matsuura et al. . | |
| 4,904,630 | 2/1990 | Matsuura et al. .................. | 526/119 |
| 4,931,517 | 6/1990 | Fujita . | |
| 4,970,186 | 11/1990 | Terano et al. . | |
| 4,972,034 | 11/1990 | Matsuura et al. .................. | 526/125 |
| 5,082,818 | 1/1992 | Matsuura et al. .................. | 526/125 |
| 5,147,839 | 9/1992 | Fujita et al. .................. | 526/125 |
| 5,177,162 | 1/1993 | Matsuura et al. . | |

FOREIGN PATENT DOCUMENTS

| | | |
|---|---|---|
| 0230707 | 8/1987 | European Pat. Off. . |
| 0244678 | 11/1987 | European Pat. Off. . |
| 3244871 | 6/1983 | Germany . |
| 2112402 | 7/1983 | United Kingdom . |

*Primary Examiner*—Edward J. Smith
*Attorney, Agent, or Firm*—Oblon, Spivak, McClelland, Maier & Neustadt

[57] ABSTRACT

Ziegler polymerization of $C_3$ or higher α-olefins is disclosed which is characterized by a solid catalyst component and an organoaluminum component used in the Ziegler catalyst, and also by the temperature used which is 150° to 300° C. The solid catalyst component, Component (A), comprises Sub-component (i) which is a solid catalyst component for Ziegler catalysts comprising Ti, Mg and a halogen; Sub-component (ii) which is a silicon compound represented by a formula: $R^1_m X_n Si(OR^2)_{4-n-m}$ wherein $R^1$ indicates a hydrocarbyl group, $R^2$ which may be the same as or different from $R^1$ indicates a hydrocarbyl group, X is a halogen atom, and m and n are each a number satisfying equations $0 \leq m \leq 3$, $0 \leq n \leq 3$ and $0 \leq m+n \leq 3$; and Sub-component (iii) which is an organometal compound of a metal of Groups I to IV of the Periodic Table. The organoaluminum component (B) is an organoaluminum compound represented by a formula $$R^3_{3-p} H_p Al$$

wherein $R^3$ indicates a hydrocarbyl group of up to 5 carbon atoms and p is a number satisfying an equation $0 \leq p \leq 1$;

the mole ratio in Al/Ti of Component (B) to Component (A) being no higher than 1. The poly α-olefins produced have a broader molecular weight distribution than those produced at a lower polymerization temperature.

5 Claims, No Drawings

PRODUCTION OF OLEFIN POLYMERS

This application is a continuation of application Ser. No. 07/842,631, filed on Feb. 27, 1992, now abandoned.

BACKGROUND OF THE INVENTION

1. Field of the Art

The present invention relates to Ziegler polymerization of olefins. More particularly, the present invention is concerned with Ziegler polymerization of olefins, typically α-olefins of at least 3 carbon atoms, characterized by, among others, the solid catalyst components comprising a transition metal in Ziegler catalysts and the polymerization temperature used which is no lower than 150° C.

Use of the solid catalyst component in accordance with the present invention in Ziegler catalysts as the transition metal component at the temperature will make it possible to produce polymers endowed with improved stereoregularity and broadened molecular weight distribution.

2. Background of the Invention

The catalysts heretofore proposed for the polymerization of olefins comprising a solid catalyst component containing titanium, magnesium and a halogen as the essential components and an organoaluminum compound (and an electron donor, if desired) have produced highly stereoregular polymers.

Such prior art catalysts are such that their catalyst activity may often be found at a polymerization temperature of 90° C. or lower, preferably 80° C. or lower.

It has been known in the art that ethylene polymerizes at such a higher temperature as 150° to 250° C. similarly at a temperature of 70° to 90° C. and that polymerization of ethylene at such a higher temperature is known to have such preferable characteristics that the polyethylenes produced have a narrower molecular weight distribution or copolymerizability of ethylene with another monomer is improved.

It has also been known in the art that propylene will not produce polymers endowed with acceptably high stereoregularity when it is polymerized at such a high temperature as 150° C. or higher. One possible reason therefor may be such that the solid structure comprising the titanium component capable of polymerizing propylene into polymers of high stereoregularity is destroyed at a temperature no lower than 150° C., the titanium component is agglomerated or excessively reduced by the organoaluminum component as a co-catalyst, or, when an electron donor is used during polymerization as what is called "outside electron donor", it reacts so strongly with the titanium component or with the organoaluminum component at such a higher temperature that the catalyst activity is thus lowered.

Catalysts which are capable of producing highly stereoregular polymers at such a high temperature as no lower than 150° C. have, to the best of the present inventors, not been proposed.

It has also been known to use as an organoaluminum component in the Ziegler catalysts organoaluminum compounds which contain a halogen atom. The halogen atom may have such a problem due to its inherent corrosive nature that polyolefins produced therewith can corrode or rust processing machines for the polymers. An organoaluminum component in Ziegler catalysts which is free from a halogen contained therein has heretofore been desired.

SUMMARY OF THE INVENTION

The present invention is based on the discovery that the above problems can be solved by use of a specified solid catalyst component in Ziegler catalysts.

More particularly, the present invention presents a process for producing α-olefin polymers which comprises contacting at a temperature of 150° C. to 300° C. an olefin with a catalyst thereby to polymerize the olefin, the catalyst comprising:

Component (A) which is a solid catalyst component for Ziegler catalysts, which solid catalyst component is obtained by contacting the following Sub-components (i) to (iii):

Sub-component (i) which is a solid catalyst component for Ziegler catalysts comprising titanium, magnesium and a halogen as the essential components;

Sub-component (ii) which is a silicon compound represented by a formula

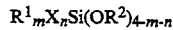

$$R^1{}_m X_n Si(OR^2)_{4-m-n}$$

wherein $R^1$ indicates a hydrocarbyl group of 1 to 20 carbon atoms, $R^2$ which may be the same as or different from $R^1$ indicates a hydrocarbyl group of 1 to 20 carbon atoms, X indicates a halogen atom, and m and n are each numbers satisfying equations $0 \leq m \leq 3$, $0 \leq n \leq 3$ and $0 \leq (m+n) \leq 3$; and Sub-component (iii) which is an organometal compound of a metal of the Groups I to III of the Periodic Table; and Component (B) which is an organoaluminum compound represented by a formula

$$R^3{}_{3-p} H_p Al$$

wherein $R^3$ indicates a hydrocarbyl group of up to 5 carbon atoms and p is a number satisfying an equation $0 \leq p \leq 1$;

the mole ratio in Al/Ti of Component (B) to Component (A) being no higher than 1.

It has now been possible in accordance with the present invention that highly stereoregular olefin polymers are produced at a temperature of 150° C. or higher where it would have not been possible to prepare such polymers in yield of a level comparable to that obtained by polymerization at a lower temperature of 80° C. or lower using known Ziegler catalysts.

The polymer produced by the present invention is characterized by the fact that they have broader molecular weight distribution than those produced at a lower polymerization temperature of 80° C. or lower.

DETAILED DESCRIPTION OF THE INVENTION

I Catalyst

The catalyst of the present invention comprises a combination of specific components (A) and (B). Here, the wording "comprises" means that the components are not limited only to those mentioned (namely, A and B), and includes co-presence of other components compatible with or suited for the purpose, such as an outside electron donor which is not essential but can be used if desired.

Component (A)

The Component (A) of the catalyst of the present invention is a solid catalyst component for Ziegler catalysts obtained by contacting the Sub-components (i) to (iii) shown below. The contact product of the Sub-components (i) to (iii) is washed amply with an inert hydrocarbon solvent to form the Component (A). Here, the wording "obtained by contacting" means that the components are not limited only to those mentioned, namely (i) to (iii), and includes co-presence of other components suited for the purpose.

Sub-component (i)

Sub-component (i) is a solid component comprising titanium, magnesium and a halogen as the essential components. Here, the wording "comprising as the essential components" indicates that it can also contain other elements suited for the purpose than the three components mentioned, that these elements can exist any desired compound suited for the purpose respectively, and also that these elements can also exist in the form mutually bonded together. Solid components containing titanium, magnesium and a halogen are known per se. For example, those as disclosed in Japanese Laid-open Patent Publications Nos. 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984 and 149906/1984 may be employed.

As the magnesium compound which is the magnesium source to be used in the present invention, magnesium dihalides, dialkoxymagnesiums, alkoxymagnesium halides, magnesium oxyhalides, dialkylmagnesiums, magnesium oxide, magnesium hydroxide, carboxylates of magensium, etc. are exemplified. Among these magnesium compounds, magnesium dihalides, dialkoxymagnesiums and alkoxymagnesium halides, particularly $MgCl_2$, are preferred.

As the titanium compound which is the titanium source, compounds represented by the formula $Ti(OR^4)_{4-q}X_q$ (wherein $R^4$ is a hydrocarbyl group, preferably having about 1 to 10 carbon atoms, X represents a halogen atom and q is an integer of $0 \leq q \leq 4$) and polymers of a titanium tetraalkoxide.

Specific examples may include:
titanium tetrahalides such as $TiCl_4$, $TiBr_4$ and the like; alkoxytitanium halides such as $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-nC_4H_9)Cl_3$, $Ti(O-nC_4H_9)_2Cl_2$, $Ti(OC_2H_5)Br_3$, $Ti(OC_2H_5)(OC_4H_9)_2Cl$, $Ti(O-nC_4H_9)_3Cl$, $Ti(O-C_6H_5)Cl_3$, $Ti(O-iC_4H_9)_2Cl_2$, $Ti(OC_5H_{11})Cl_3$, $Ti(OC_6H_{13})Cl_3$, and the like;
and titanium tetraalkoxides such as $Ti(OC_2H_5)_4$, $Ti(O-iC_3H_7)_4$, $Ti(O-nC_3H_7)_4$, $Ti(O-nC_4H_9)_4$, $Ti(O-iC_4H_9)_4$, $Ti(O-nC_5H_{11})_4$, $Ti(O-nC_6H_{13})_4$, $Ti(O-nC_7H_{15})_4$, $Ti(O-nC_8H_{17})_4$, $Ti[OCH_2CH(CH_3)_2]_4$, $Ti[OCH_2CH(C_2H_5)C_4H_9]_4$, and the like.

Polymers of a titanium tetraalkoxide may include those represented by the following formula:

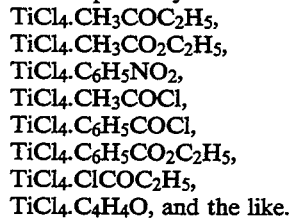

wherein, $R^5$-$R^8$ represent the same or different hydrocarbyl groups, preferably aliphatic hydrocarbyl group having 1 to 10 carbon atoms or aromatic hydrocarbyl groups, particularly aliphatic hydrocarbyl groups having 2 to 6 carbon atoms. n represents a number of 2 or more, particularly a number up to 20. The value of n should be desirably selected so that the polytitanate itself or as a solution can be provided in a liquid state for the contact step with other components. A suitable n selected in view of ease of handling may be about 2 to 14, preferably 2 to 10. Specific examples of such polytitanates may include n-butylpolytitanate (n=2 to 10), hexylpolytitanate (n=2 to 10), n-octylpolytitanate (n=2 to 10), and the like. Among them, n-butylpolytitanate is preferred.

It is also possible to use, as the titanium compound for the titanium source, a molecular compound obtained by reacting an electron donor as described below with a compound $TiX'_4$ (where $X'$ represents a halogen). Specific examples may include:
$TiCl_4 \cdot CH_3COC_2H_5$,
$TiCl_4 \cdot CH_3CO_2C_2H_5$,
$TiCl_4 \cdot C_6H_5NO_2$,
$TiCl_4 \cdot CH_3COCl$,
$TiCl_4 \cdot C_6H_5COCl$,
$TiCl_4 \cdot C_6H_5CO_2C_2H_5$,
$TiCl_4 \cdot ClCOC_2H_5$,
$TiCl_4 \cdot C_4H_4O$, and the like.

Among these titanium compounds, $TiCl_4$, $Ti(OC_2H_5)_4$, $Ti(O-nC_4H_9)_4$, and $Ti(O-nC_4H_9)Cl_3$ are preferred. Particularly, $TiCl_4$ and $Ti(O-nC_4H_9)_4$ are preferred.

As to the halogen source, it is a common practice to supply the halogen from the halide compounds of magnesium and/or titanium as described above, but it can be also supplied from known halogenating agents such as halogen compounds of aluminum, halogen compounds of silicon, halogen compounds of phosphorus, and the like.

The halogen contained in the catalyst components may be fluorine, chlorine, bromine, iodine or a mixture of these, particularly preferably chlorine.

The solid component to be used in the present invention can also include, in addition to the above essential components: a silicon compound such as $SiCl_4$, $CH_3SiCl_3$, and the like; a polymeric silicon compound having the structure represented by the following formula:

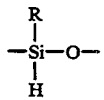

(wherein R is a hydrocarbyl group having about 1 to 10, preferably about 1 to 6 carbon atoms) and having a viscosity of about 1 centistoke to 100 centistokes, such as methylhydrogenpolysiloxane, ethylhydrogenpolysiloxane, phenylhydrogenpolysiloxane, cyclohexylhydrogenpolysiloxane, 1,1,3,3-tetramethyldisiloxane, 1,3,5,7-tetramethylcyclotetrasiloxane, 1,3,5,7,9-pentamethylcyclopentasiloxane and the like; an aluminum compound such as $Al(OiC_3H_7)_3$, $AlCl_3$, $AlBr_3$, $Al(OC_2H_5)_3$, $Al(OCH_3)_2Cl$; a boron compound such as $B(OCH_3)_3$, $B(OC_2H_5)_3$, $B(OC_6H_5)_3$; $WCl_6$ and $MoCl_5$. These optional compounds may remain in the solid component as the components of silicon, aluminum and boron.

Further, in preparing the solid component, use can also be made of an electron donor as what is called "an inside donor".

Examples of the electron donor or the inside donor which can be used for preparation of the solid component may include oxygen-containing electron donors such as alcohols, phenols, ketones, aldehydes, carboxylic acids, esters of an organic acid or an inorganic acid, ethers, acid amides, acid anhydrides, and the like; and nitrogen-containing electron donors such as ammonia, amines, nitriles, isocyanates, and the like.

More specifically, there may be included: (a) alcohols having 1 to 18 carbon atoms, such as methanol, ethanol, propanol, pentanol, hexanol, octanol, dodecanol, octadecyl alcohol, benzyl alcohol, phenylethyl alcohol, isopropylbenzyl alcohol and the like; (b) phenols having 6 to 25 carbon atoms which may or may not have an alkyl group, such as phenol, cresol, xylenol, ethylphenol, propylphenol, isopropylphenol, nonylphenol, naphthol and the like; (c) ketones having 3 to 15 carbon atoms, such as methyl ethyl ketone, methyl isobutyl ketone, acetophenone, benzophenone and the like; (d) aldehydes having 2 to 15 carbon atoms, such as acetaldehyde, propionaldehyde, octylaldehyde, benzaldehyde, tolualdehyde, naphthaldehyde and the like; (e) organic acid esters having 2 to 20 carbon atoms, such as methyl formate, methyl acetate, ethyl acetate, vinyl acetate, propyl acetate, octyl acetate, cyclohexyl acetate, cellosolve acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarine, phthalide, ethylene carbonate, cellosolve acetate, cellosolve isobutyrate and cellosolve benzoate, etc.; (f) inorganic acid esters, such as silicates such as ethyl silicate, butyl silicate, phenyl-triethoxysilane, etc.; (g) acid halides having 2 to 15 carbon atoms, such as acetyl chloride, benzoyl chloride, toluyloic chloride, anisic chloride, phthaloyl chloride, phthaloyl isochloride and the like; (h) ethers having 2 to 20 carbon atoms, such as methyl ether, ethyl ether, isopropyl ether, butyl ether, amyl ether, tetrahydrofuran, anisole, diphenyl ether and the like; (i) acid amides, such as acetic amide, benzoic amide, toluyloic amide and the like; (j) amines, such as monomethylamine, monoethylamine, diethylamine, tributylamine, piperidine, tribenzylamine, aniline, pyridine, picoline, tetramethylethylenediamine and the like; and (k) nitriles, such as acetonitrile, benzonitrile, toluinitrile and the like. One or more of these electron donors can be used in preparing the solid catalyst component. Among them, preferred are organic acid esters and acid halides, particularly preferably phthalic acid esters, phthalic acid halides, and cellosolve acetate.

The amounts of the above respective components used may be at any desired level, so long as the advantages inherent in the present invention can be attained, but, generally speaking, the following ranges are preferred.

The amount of the titanium compound used may be within the range of $1 \times 10^{-4}$ to 1000, preferably 0.01 to 10, in terms of molar ratio relative to the amount of the magnesium compound used. When a compound as the halogen source is used, its amount used may be within the range of $1 \times 10^{-2}$ to 1000, preferably 0.1 to 100, in terms of a molar ratio relative to magnesium used, irrespective of whether the titanium compound and/or the magnesium compound may contain a halogen-or not.

The amount of the silicon, aluminum, boron, wolfram or molybdenum compound when used may be within the range of $1 \times 10^{-3}$ to 100, preferably 0.01 to 10, in terms of a molar ratio to the amount of the above magnesium compound used.

The amount of the electron donor compound when used may be within the range of $1 \times 10^{-3}$ to 10, preferably 0.01 to 5, in terms of a molar ratio relative to the amount of the above magnesium compound used.

The solid component for preparing the Sub-component (i) may be prepared from the titanium source, the magnesium source and the halogen source, and further optionally other components such as an electron donor according to methods mentioned below.

(a) A method in which a magnesium halide optionally together with an electron donor is contacted with a titanium compound.

(b) A method in which alumina or magnesia is treated with a phosphorus halide compound, and the product is contacted with a magnesium halide, an electron donor, a titanium halide-containing compound.

(c) A method in which the solid component obtained by contacting a magnesium halide with a titanium tetraalkoxide and a specific polymeric silicon compound is contacted with a titanium halide compound and/or a silicon halide compound.

As the polymeric silicon compound, those represented by the following formula are suitable:

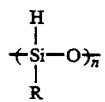

wherein R is a hydrocarbyl group having about 1 to 10 carbon atoms, n is a polymerization degree such that the viscosity of the polymeric silicon compound may be 1 to 100 centistokes.

Among them, methylhydrogenpolysiloxane, 1,3,5,7-tetramethylcyclotetrasiloxane, 1,3,5,7,9-pentamethylcyclopentacycloxane, ethylhydrogenpolysiloxane, phenylhydrogenpolysiloxane, and cyclohexylhydrogen polysiloxane are preferred.

(d) A method in which a magnesium compound is dissolved in a titanium tetraalkoxide and an electron donor, and the solid component precipitated from the solution upon addition thereto of a halogenating agent or a titanium halide compound is contacted with a titanium compound. Examples of halogenating agents include silicon halides, aluminium halides, and halogen compounds of phosphorus.

(e) A method in which an organomagnesium compound such as Grignard reagent, etc. is reacted with a halogenating agent, a reducing agent, etc., and then the reaction product is contacted with an electron donor and a titanium compound.

(f) A method in which an alkoxymagnesium compound is contacted with a halogenating agent and/or a titanium compound in the presence or absence of an electron donor.

Among these methods, method (c), (d) and (f) are preferable.

Sub-component (ii)

Sub-component (ii) for preparing the Component (A) is a silicon compound expressed by a formula $$R^1{}_mX_nSi(OR^2)_{4-m-n}$$

wherein $R^1$ is a hydrocarbyl group of 1 to 20 carbon atoms, $R^2$ is a hydrocarbyl group of 1 to 20 carbon atoms which is the same as or different from $R^1$, X is a halogen atom, and m and n are each numbers satisfying equations $0 \leq m \leq 3$, $0 \leq n \leq 3$ and $0 \leq (m+n) \leq 3$.

$R^1$ and $R^2$ have 1 to 20, preferably 1 to 10, carbon atoms and may be in a branched or straight configuration, respectively.

X is preferably a chlorine atom at least from an economical point of view.

$R^2$ may be an aliphatic hydrocarbyl group, and preferably is a hydrocarbyl group of 1 to 4 carbon atoms.

Specific examples of the silicon compounds may include:

(CH$_3$)Si(OCH$_3$)$_3$,
(CH$_3$)Si(OC$_2$H$_5$)$_3$,
(C$_2$H$_5$)$_2$Si(OCH$_3$)$_2$,
(i-C$_3$H$_7$)$_2$Si(OCH$_3$)$_2$
(n-C$_6$H$_{13}$)Si(OCH$_3$)$_3$,
(i-C$_3$H$_7$)Si(OC$_2$H$_5$)$_3$,
(i-C$_4$H$_9$)$_2$Si(OCH$_3$)$_2$,
(C$_6$H$_{11}$)$_2$Si(OCH$_3$)$_2$,
(C$_6$H$_{11}$)(CH$_3$)Si(OCH$_3$)$_2$,
(C$_6$H$_{11}$)$_2$Si(OCH$_3$)$_2$,
(C$_6$H$_{11}$)(CH$_3$)Si(OCH$_3$)$_2$,
(C$_5$H$_4$)$_2$Si(OCH$_3$)$_2$,
(C$_5$H$_4$)(CH$_3$)Si(OCH$_3$)$_2$,
(C$_2$H$_5$)Si(OC$_2$H$_5$)$_3$,
(n-C$_{10}$H$_{21}$)Si(OC$_2$H$_5$)$_3$,
Cl(CH$_2$)$_3$Si(OCH$_3$)$_3$,
Si(OCH$_3$)$_4$,
Si(OC$_2$H$_5$)$_3$Cl,
(C$_2$H$_5$)$_2$Si(OC$_2$H$_5$)$_2$,
(C$_{17}$H$_{35}$)Si(OCH$_3$)$_3$,
Si(OC$_2$H$_5$)$_4$,
(C$_6$H$_5$)Si(OCH$_3$)$_3$,
Si(OCH$_3$)$_2$Cl$_2$,
(C$_6$H$_5$)$_2$Si(OCH$_3$)$_2$,
(C$_6$H$_5$)(CH$_3$)Si(OCH$_3$)$_2$,
(C$_6$H$_5$)Si(OC$_2$H$_5$)$_3$,
(C$_6$H$_5$)$_2$Si(OC$_2$H$_5$)$_2$,
NC(CH$_2$)$_2$Si(OC$_2$H$_5$)$_3$,
(C$_6$H$_5$)(CH$_3$)Si(OC$_2$H$_5$)$_2$,
(n-C$_3$H$_7$)Si(OC$_2$H$_5$)$_3$,
(CH$_3$)Si(OC$_3$H$_7$)$_3$,
(C$_6$H$_5$)(CH$_2$)Si(OC$_2$H$_5$)$_3$,

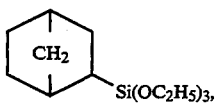
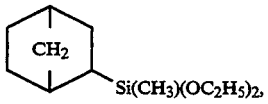
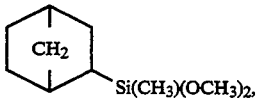
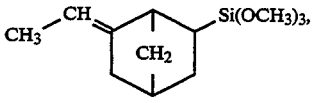
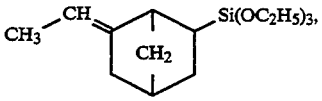
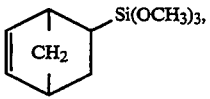

(CH$_3$)$_3$CSi(CH$_3$)(OCH$_3$)$_2$,
(CH$_3$)$_3$CSi(HC(CH$_3$)$_2$)(OCH$_3$)$_2$,
(CH$_3$)$_3$CSi(CH$_3$)(OC$_2$H$_5$)$_2$,
(C$_2$H$_5$)$_3$CSi(CH$_3$)(OCH$_3$)$_2$,
(CH$_3$)(C$_2$H$_5$)CHSi(CH$_3$)(OCH$_3$)$_2$,
((CH$_3$)$_2$CHCH$_2$)$_2$Si(OCH$_3$)$_2$,
(C$_2$H$_5$)(CH$_3$)$_2$CSi(CH$_3$)(OCH$_3$)$_2$,
(C$_2$H$_5$)(CH$_3$)$_2$CSi(CH$_3$)(OC$_2$H$_5$)$_2$,
(CH$_3$)$_3$CSi(OCH$_3$)$_3$,
(CH$_3$)$_3$CSi(OC$_2$H$_5$)$_3$,
(C$_2$H$_5$)$_3$CSi(OC$_2$H$_5$)$_3$,
(CH$_3$)(C$_2$H$_5$)CHSi(OCH$_3$)$_3$,
(C$_2$H$_5$)(CH$_3$)CSi(OCH$_3$)$_3$,
(C$_2$H$_5$)(CH$_3$)CSi(OC$_2$H$_5$)$_3$,
(C$_2$H$_5$)$_3$CSi(OC$_2$H$_5$)$_3$,
(CH$_3$)(C$_2$H$_5$)CHSi(OCH$_3$)$_3$,
((CH$_3$)$_3$C)$_2$Si(OCH$_3$)$_2$.

It is preferable that $R^1$ has a branch at the carbon atom adjacent to the silicon atom. The branch may preferably be an alkyl group or a cycloalkyl group. More preferably, the carbon atom adjacent to the silicon atom, namely α-carbon atom, is a secondary or tertiary carbon atom in a branched hydrocarbyl group having 3 to 20 carbon atoms. Most preferably, the carbon atom connected with the silicon atom is a tertiary carbon atom in a branched hydrocarbyl group having 4 to 10 carbon atoms.

Sub-component (iii)

Sub-component (iii) for preparing a solid catalyst component in accordance with the present invention is an organometal compound of a metal of the Group I to III of the Periodic Table.

Examples of the metals include lithium, magnesium, aluminum and zinc, but aluminum is representable.

The compounds are organometal compounds and thus have at least one organic radical-metal bonding. The organic radical may typically be a hydrocarbyl group of 1 to 20 carbon atoms, preferably 1 to 10 carbon atoms, more preferably 1 to 6 carbon atoms.

The remaining valence of the metal in question other than those satisfied by an organic radical, if any, can be satisfied by a hydrogen atom, a halogen atom, hydrocarbyloxy group of 1 to 10, preferably 1 to 6, carbon atoms, or the metal itself with an oxygen bridge therebetween such as

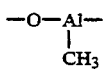

when the compounds are methylaluminoxanes.

Specific examples of such organometal compounds may include: (a) organolithium compounds, e.g. methyllithium, n-butyllithium, sec.-butyllithium, tert.-butyllithium and the like; (b) organomagnesium compounds, e.g. diethylmagnesium, ethylbutylmagnesium, dibutylmagnesium, dihexylmagnesium, hexylethylmagnesium, ethylmagnesium chloride, ethylmagnesium bromide, butylmagnesium chloride, tert.-butylmagnesium bromide, and the like; (c) organozinc compounds, e.g. diethylzinc, dimethylzinc, dibutylzinc, and the like; (d) organoaluminum compounds, e.g. trimethylaluminum, triethylaluminum, triisobutylaluminum, tri-n-hexylaluminum, diethylaluminum chloride, diethylaluminum hydride, diethylaluminum ethoxide, ethylaluminum sesquichloride, ethylaluminum dichloride, methylaluminoxane, and the like. Among these, organoaluminum compounds and organozinc compounds, especially the former, are preferable.

The most preferable are organoaluminum compounds and further examples of organoaluminum compounds may be found in the examples of organoaluminum compounds as the Component (B) which will be given hereinbelow, but include:

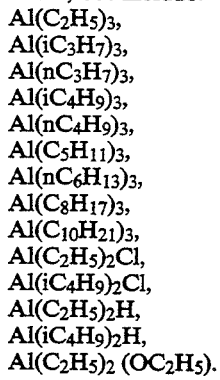

Preparation of the Component (A)

The contacting method and conditions for the Sub-components (i) to (iii) can be as desired, so long as the advantages inherent in the present invention can be attained, but generally the following conditions are preferred. The contact temperature may be about −50 to 200° C., preferably 0° to 100° C. As the contacting method, there may be employed the mechanical method wherein a rotating ball mill, a vibrating ball mill, a jet mill, a medium stirring pulverizer or the like is used and the method in which contact is effected with stirring under the presence of an inert diluent. As the inert diluent to be used, aliphatic or aromatic hydrocarbons and halohydrocarbons, polysiloxane, etc. may be exemplified.

The contacting order and the contacting time of the Sub-components (i) to (iii) in preparing the component (A) of the present invention may be any desired one, so long as the advantages inherent in the present invention are attained.

Specific orders of such contact may include those as shown below, where the symbol "+" indicates a contact between the components flanking the symbol, and a washing or rinsing processing can be interposed between the contacts.

(a) {Sub-component (i)+Sub-component (ii)}+Sub-component (iii);

(b) {Sub-component (i)+Sub-component (iii)}+Sub-component (ii);

(c) Sub-component (i)+{Sub-component (ii)+{Sub-component (iii)}+{Sub-component (ii)+Sub-component (iii);

(d) {Sub-component (ii)+Sub-component (iii)}+Sub-component (i);

(e) Sub-component (i)+Sub-component (ii)+Sub-component (iii).

The quantitative ratio of the Sub-components (i) to (iii) can be any desired one, so long as the advantages inherent in the present invention can be attained, but generally preferred to be within the following ranges.

The quantitative ratio of the Sub-component (i) to (ii) may be within the range of 0.01 to 1000, preferably 0.1 to 100, in terms of the atomic ratio (silicon/titanium) of the silicon of the. Sub-component (ii) to the titanium component constituting the Sub-component (i).

The Sub-component (iii) is used in an amount within the range of 0.01 to 100, preferably 0.1 to 30, in terms of the atomic ratio of the metals {(Sub-component (iii)/titanium(Sub-component (i)}.

Modification of the Component (A) can be applied provided that the advantages inherent in the present invention may not be impaired.

One of the modification comprises use of another component other than Sub-components (i) to (iii) during the process for preparing Component (A), such as methylhydrogenpolysiloxane, ethyl borate, aluminum triisopropoxide, aluminum trichloride, silicon tetrachloride, a tetra-valent titanium compound of a formula: $Ti(OR^9)_{4-s}X_s$ where $R^9$ is a hydrocarbyl group preferably of 1 to 6 carbon atoms, X is a halogen atom, and s is $0 \leq s \leq 4$, a tri-valent titanium compound, wolfram hexachloride, molybdenum pentachloride and the like.

The contact product of the Sub-components (i) to (iii) is washed amply with an inert hydrocarbon solvent to form the Component (A). Particular examples of the inert hydrocarbon solvent include those conventionally used in preparing the transition metal components for Ziegler catalysts such as, for example, hexane, heptane, octane, decane, cyclohexane and toluene.

One typical example of the optional component for modifying the Component (A) is a group of vinylsilane compounds.

Examples of vinylsilane compounds are derivatives of monosilane ($SiH_4$) such that at least one of the hydrogen atoms has been replaced by vinyl group ($CH_2=CH-$) and one or some of the remaining hydrogen atoms has been replaced by a halogen atom, preferably a chlorine atom, an alkyl, preferably one having 1 to 12 carbon atoms, an alkoxy, preferably one having 1 to 12 carbon atoms, or an aryl, preferably phenyl.

Specific examples of vinylsilane compounds include:
$CH_2=CH-SiH_3$,
$CH_2=CH-SiH_2(CH_3)$,
$CH_2=CH-SiH(CH_3)_2$, $CH_2=CH-Si(CH_3)_3$,
$CH_2=CH-SiCl_3$,
$CH_2=CH-SiCl_2(CH_3)$,
$CH_2=CH-SiCl(CH_3)H$,
$CH_2=CH-SiCl(C_2H_5)_2$,
$CH_2=CH-Si(C_2H_5)_3$,
$CH_2=CH-Si(CH_3)(C_2H_5)_2$,
$CH_2=CH-Si(C_6H_5)(CH_3)_2$,
$CH_2=CH-Si(CH_3)_2(C_6H_4CH_3)$,
$CH_2=CH-Si(OCH_3)_3$,
$CH_2=CH-Si(OC_2H_5)_3$,
$CH_2=CH-Si(C_2H_5)(OCH_3)_2$,
$CH_2=CH-Si(OC_2H_5)_2H$,

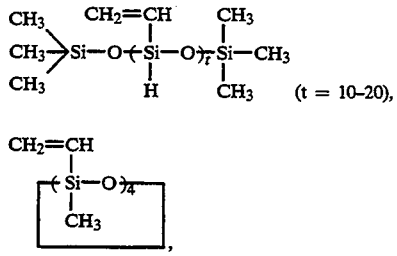
(t = 10-20), $CH_2=CH(CH_3)_2-Si-O-Si(CH_3)_2(CH=CH_2)$,
$(CH_2=CH)_2SiCl_2$, and
$(CH_2=CH)_2Si(CH_3)_2$.

Preferable vinylsilane compounds are those having no oxygen atoms, and more preferable vinylsilane compounds are vinylalkylsilanes and vinylchlorosilanes.

The amount of the vinylsilane compounds is 0.001 to 1000, preferably 0.01 to 100, in terms of mole ratio to the titanium component of the component (i).

Component (B)

The component (B) is an organoaluminum compound represented by a formula $$R^3{}_{3-p}H_pAl$$

wherein $R^3$ indicates a hydrocarbyl group of up to 5 carbon atoms, preferably up to 4 carbon atoms, and p is a number satisfying an equation $0 \leq p \leq 1$.

Examples of the organoaluminum compounds for Component (B) include: $Al(C_2H_5)_3$, $Al(CH_3)_3$, $Al(iC_3H_7)_3$, $Al(n-C_3H_7)_3$, $AL(C_2H_5)_2H$, $Al(nC_3H_7)H$, $Al(iC_4H_9)_3$, $Al(n-C_4H_9)_3$, and $Al(iC_4H_9)_2H$. These can be used in admixture.

Making up of a catalyst

The catalysts in accordance with the present invention may be made up by contacting Components (A) and (B) or (A), (B) and an optional component each other at once, or step-wisely or portion-wisely, within or outside a polymerization vessel in the absence or presence of an α-olefin to be polymerized.

The amount of the Component (B) used is, in accordance with one of the features of the present invention, no higher than 1, more preferably less than 1, but not less than 0.001, still preferably 0.001 to 1, more preferably 0.01 to 0.5, in terms of mole ratio of Al/Ti of the Component (B)/Component (A).

The Components (A) and (B) can be introduced to the place where they are contacted in any suitable way, but it may be preferred to bring it into contact each in a dispersion in an aliphatic hydrocarbon such as hexane or heptane before or after they are introduced into a polymerization vessel.

II Polymerization of olefins

The polymerization of olefins in accordance with the present invention is characterized by, inter alia, the temperature used, which is 150° C. or higher.

The upper limit of the polymerization temperature may be around 300° C. The preferable temperature range may be 150° to 250° C.

Not only are the catalysts of the present invention applicable to ordinary slurry polymerization but they may also be used for liquid-phase, solventless polymerization wherein substantially no solvent is used, solution polymerization and vapor-phase polymerization, in a continuous or a batch-wise fashion. The catalysts in accordance with the present invention can be used not only in continuous polymerization and batchwise polymerization but also in the polymerization wherein a preliminary polymerization is conducted in which a small amount of an α-olefin is polymerized by the catalyst. In the case of slurry polymerization, aliphatic or aromatic hydrocarbons such as hexane, heptane, pentane, cyclohexane, benzene, toluene and kerosene are used alone or in combination as the polymerization solvent. The polymerization may be practiced under any pressure, preferably under a pressure of atmospheric to 1000 kg/cm²G, preferably atmospheric to 150 kg/cm², and hydrogen can be used additionally as the molecular-weight control agent.

The olefins to be polymerized with the catalyst systems of the present invention are represented by the general formula:

$$R^{10}-CH=CH_2$$

wherein $R^{10}$ is a hydrocarbyl group which has 1 to 10, preferably 1 to 6, carbon atoms and may be in a linear or branch structure.

Specific examples of such olefins may include propylene, butene-1, pentene-1, hexene-1, 3-methylbutene-1 and 4-methylpentene-1. Preference is given to propylene, 3-methylbutene-1 and 4-methylpentene-1, propylene being more preferable. These α-olefin can be used in combination.

The poly α-olefins thereby obtained are characterized by their molecular weight distribution which is broader than that in poly α-olefins produced at a temperature of 80° C. or lower.

EXPERIMENTAL EXAMPLES

Example-1

Preparation of Component (A)

Into a flask purged with nitrogen was introduced 200 ml of dehydrated and deoxygenated n-heptane, and subsequently 0.4 mol of $MgCl_2$ and 0.8 mol of Ti(O-nC$_4$H$_9$)$_4$ and the reaction was carried out at 95° C. for 2 hours. After completion of the reaction, the temperature was lowered to 40° C., followed by addition of 48 ml of methylhydrogenpolysiloxane (of 20 centistokes) and the reaction was carried out for 3 hours. The solid component formed was washed with n-heptane.

Into a flask purged with nitrogen was introduced 50 ml of n-heptane purified similarly as described above, and the solid component synthesized above was introduced in an amount of 0.24 mol as calculated on Mg atom. Then, a mixture of 25 ml of n-heptane with 0.8 mol of $SiCl_4$ was introduced into the flask at 30° C. over 30 minutes, and the reaction was carried out at 90° C.

for 4 hours. After completion of the reaction, the product was washed with n-heptane.

Into a flask purged with nitrogen was introduced 50 ml of amply purified n-heptane, and then 5 g of the solid component obtained above, Sub-component (i), was introduced. Next, 2.4 ml of $(CH_3)_3CSi(CH_3)(OCH_3)_2$ as the silicon compound of the Sub-component (ii), 2.0 ml of vinyltrimethylsilane as an optional component, and 3.0 g of triethylaluminum of the Sub-component (iii) were respectively introduced and contacted at 30° C. for 2 hours.

The solid product obtained was thoroughly washed with n-heptane to provide the Component (A), which was found upon analysis on its portion to contain 2.50% by weight of titanium. The content of $(CH_3)_3CSi(CH_3)(OCH_3)_2$ was 17.6% by weight.

Polymerization of propylene

Into a stainless steel autoclave with a stirring and a temperature control means of 1.5 liter capacity were introduced 500 ml of amply dehydrated and deoxygenated n-paraffin, 3.0 mg of triethylaluminum as Component (B) and 100 mg of the above synthesized Component (A), the Al/Ti mole ratio being 0.5. Polymerization of propylene was conducted at a temperature of 170° C. and under a pressure of 9 Kg/cm$^2$G for 2 hours, after which the polymer solution obtained was subjected to treatment with methanol to separate the polymer from the n-paraffin and the polymer obtained was dried.

A polymer in a yield of 37.4 g was obtained.

The polymer had a content of the fraction soluble in xylene at 20° C., which is hereinbelow referred to as CXS, was 1.76% by weight.

The polymer had a molecular weight distribution such that the Q-value, which is a ratio of $M_w/M_N$ where $M_w$ stands for weight average molecular weight and $M_N$ stands for number average molecular weight, upon the gel permeation chromatography was 7.1.

Example-2

Preparation of Component (A)

Into a flask purged with nitrogen was introduced 200 ml of dehydrated and deoxygenated n-heptane, and subsequently 0.4 mol of $MgCl_2$ and 0.8 mol of $Ti(O-nC_4H_9)_4$ and the reaction was carried at 95° C. for 2 hours. After completion of the reaction, the temperature was lowered to 40° C., followed by addition of 48 ml of methylhydrogenpolysiloxane (of 20 centistokes) and the reaction was carried out for 3 hours. The solid component formed was washed with n-heptane.

Into a flask purged with nitrogen was introduced 50 ml of n-heptane purified similarly as described above, and the solid component synthesized above was introduced in an amount of 0.24 mol as calculated on Mg atom. Then, a mixture of 25 ml of n-heptane with 0.4 mol of $SiCl_4$ was introduced into the flask at 30° C. over 30 minutes, and the reaction was carried out at 70° C. for 3 hours. After completion of the reaction, the product was washed with n-heptane.

Then, 0.024 mole of phthaloyl chloride in 25 ml of n-heptane was introduced into the flask at 90° C. for 30 minutes and the reaction was conducted at 90° C. for 1 hour. The product was then washed with n-heptane. 20 ml of $SiCl_4$ was then introduced and reacted at 80° C. for 6 hours, after which the product was washed with n-heptane. The solid product produced was found to contain 1.21% by weight of titanium.

Into a flask purged with nitrogen was introduced 50 ml of thoroughly purified n-heptane, and then 5 g of the solid component obtained above, Sub-component (i), was introduced. Next, 1.2 ml of $(CH_3)_3CSi(CH_3)(OCH_3)_2$ as the silicon compound of the Sub-component (ii), 1.2 ml of divinyldimethylsilane as an optional component and 1.7 g of triethylaluminum of the Sub-component (iii) were respectively introduced and contacted at 30° C. for 2 hours. After completion of the contact, the product was amply washed with n-heptane to provide a component (A), which was found to contain 0.89% by weight of titanium. The content of $(CH_3)_3CSi(CH_3)(OCH_3)_2$ was 9.6% by weight.

Polymerization of propylene

Polymerization of propylene was conducted as in Example-1 except for the use of 2.1 mg of triethylaluminum as Component (B). The polymer obtained was in an amount of 61.4 g and had the CXS of 1.01% by weight, the MFR of 45.3 g/10 min. and the Q-value upon GPC analysis of 7.0.

Examples 3 to 6

Polymerization of propylene was conducted in which Component (A) prepared in Example-2 was used and under the conditions which are set forth in Table-1.

The results obtained are set forth in Table-1.

TABLE-1

| Example No. | Polymerization temp. (°C.) | Component (B) and amount used | Al/Ti (mole) | H$_2$ introduced (vol %) | Polymer yield (g) | CXS (% by wt.) | Q-value ($M_W/M_N$) |
|---|---|---|---|---|---|---|---|
| 3 | 170 | (iC$_4$H$_9$)$_3$Al | 1.0 | 0 | 55.2 | 1.20 | 7.7 |
| 4 | 160 | (C$_2$H$_5$)$_3$Al | 0.3 | 10 | 99.8 | 0.98 | 6.5 |
| 5 | 150 | (iC$_4$H$_9$)$_3$Al | 0.7 | 0 | 43.2 | 1.16 | 7.2 |
| 6 | 200 | (C$_2$H$_5$)$_3$Al | 0.1 | 0 | 21.4 | 1.38 | 6.3 |

Example 7

Preparation of Component (A)

Thirty (30) stainless steel balls of 12 mm diameter were loaded into a 0.47-liter ball mill, in which 20 g of anhydrous $MgCl_2$ and 2.2 ml of dibutyl phthalate were introduced for a 48-hour ball milling. Upon completion of this ball milling, 15 g of the milled composition was introduced into a flask which had been purged with nitrogen, and 50 ml of $TiCl_4$ was added to the flask wherein contact took place at 100° C. for 2 hours. After completion of the contact, the contact product was thoroughly washed with n-heptane to give Sub-component (i).

Next, 50 ml of thoroughly purified n-heptane were introduced into a flask which had been purged with nitrogen. Subsequently, 5 g of the Sub-component (i) obtained as above, 2.4 ml of

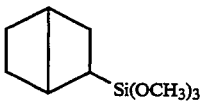

as Sub-component (ii), 0.3 ml of TiCl$_4$, 1.5 g of Al(C$_2$H$_5$)$_3$ and 0.5 g of Al(C$_2$H$_5$)Cl as Sub-component (iii) were introduced thereinto for a 2-hour contact at 20° C. After the completion of this contact, the product was thoroughly washed with n-heptane to obtain the component (A), which was formed to contain 2.8% by weight of titanium and 9.2% by weight of the silicon compound as Sub-component (ii), namely

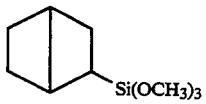

Polymerization of propylene

Polymerization of propylene was conducted as in Example-1 except for the use of 3.3 mg of (C$_2$H$_5$)$_3$Al as the Component (B), Al/Ti mole ratio being 0.5.

The polymer obtained was in an amount of 41.7 g and had the CXS of 1.96% by weight and the Q-value of 7.7.

Example 8

Preparation of Component (A)

Into a flask purged with nitrogen of a 500 ml capacity was introduced 10 g of Mg(OC$_2$H$_5$)$_2$, 100 ml of n-heptane, and subsequently 30 ml of TiCl$_4$ and, after the temperature was raised to 70° C., 3.8 ml of di-n-octyl phthalate, and the temperature was then raised to 100° C. and the contact was continued for 3 hours. The product of the contact was thoroughly washed with n-heptane to give sub-component (i).

Into a flask purged with nitrogen were introduced 50 ml of thoroughly purified n-heptane, 5 g of the sub-component (i), 1.8 ml of (iC$_3$H$_7$)$_2$Si(OCH$_3$)$_2$ as sub-component (ii), 0.5 ml of vinyltrichlorosilane as an optional component and 2.1 g of Al(C$_2$H$_5$)$_3$ as sub-component (iii), followed by contact with each other at 30° C. for 2 hours. The contact product was then thoroughly washed with n-heptane to give Component (A), which was found to contain 1.9% by weight of titanium and 10.6% by weight of the silicon compound as the sub-component (ii).

Polymerization of propylene

Polymerization of propylene was conducted as in Example-1 except for the use of 1.4 mg of Al(C$_2$H$_5$)$_3$, the mole ratio of Al/Ti being 0.3, and for the temperature of 180° C.

The polymer obtained was in an amount of 54.4 g and had CXS of 1.58% by weight and Q of 7.7.

Example 9

Preparation of Component (A)

Into a flask of 1 liter capacity purged with thoroughly purified nitrogen was introduced 15 g of filings of metallic magnesium followed by thorough drying. 315 ml of di-n-butylether and, then, 78 ml of n-butyl chloride were introduced and contacted with each other at 50° C. for 3 hours to form a solution of n-butylmagnesium chloride in di-n-butyl ether, to which 69 ml of SiCl$_4$ was added drop-wise at 15° C. for 2 hours, followed by contact with each other at 20° C. for 2 hours. After the contact, the solid product formed was washed with n-heptane. 5 g of the solid product thus obtained was sampled, to which 2.6 ml of cellosolve acetate was added, followed by contact with each other at 80° C. for 2 hours. After the contact, the solid product was thoroughly washed with n-heptane. To the solid product was added 50 ml of TiCl$_4$, followed by contact with each other at 100° C. for 4 hours. After the contact, the solid product was thoroughly washed with n-heptane to give sub-component (i).

Into a flask purged with nitrogen was introduced 50 ml of thoroughly purified n-heptane, and the sub-component (i) obtained above was introduced. Next, 0.25 ml of TiCl$_4$, 2.5 ml of

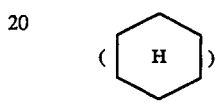

(CH$_3$)Si(OCH$_3$)$_2$ as the silicon compound of sub-component (ii) and 3 g of triethylzinc as sub-component (iii) were respectively introduced and contacted at 40° C. for 3 hours. The solid product obtained was thoroughly washed with n-heptane to provide the Component (A), which was found to contain 2.7% by weight of titanium and 8.3% by weight of the silicon compound as sub-component (ii).

Polymerization of propylene

Polymerization of propylene was conducted as in Example 1 except for the use of 0.48 mg of Al(C$_2$H$_5$)$_3$, the mole ratio of Al/Ti being 0.075 and for the temperature of 220° C.

The polymer was obtained in an amount of 11.4 g and had CXS of 1.62% by weight and Q of 7.1.

Comparative Example 1

Polymerization of propylene was conducted as in Example 1 except for the use of 3,000 mg of AL(C$_2$H$_5$)$_3$ of Component (B), the mole ratio of Al/Ti being 50. The polymer was obtained in an amount of only 1.2 g.

What is claimed is:

1. A process for producing a stereoregular propylene polymer, which comprises contacting propylene at a temperature of 150° C. to 300° C. with a catalyst thereby polymerizing the olefin, said catalyst consisting of:

Component (A) which is a solid catalyst component for a Ziegler catalyst which solid catalyst component is a contact product of the following Sub-components (i) to (iii) and the contact product being washed with an inert hydrocarbon solvent, said Sub-component (i) being a product prepared by one of the three following methods:

(a) a method in which a solid product obtained by contacting a magnesium halide with a titanium tetraalkoxide and a polymeric silicon compound is contacted with a titanium halide compound, a silicon halide compound or a mixture thereof, the polymeric silicon compound having the formula:

wherein R is a hydrocarbyl group having about 1 to 10 carbon atoms, and n is a polymerization degree such that the viscosity of the polymeric silicon compound may be 1 to 100 centistokes, thereby preparing a solid component;

(b) a method in which a magnesium compound is dissolved in a titanium tetraalkoxide and an electron donor, and then a halogenating agent is added thereto which precipitates a solid component from the solution, said halogenating agent being selected from the group consisting of a silicon halide, an aluminum halide and halogen compound of phosphorus, which solid component is then contacted with a titanium compound; and (c) a method in which an alkoxy magnesium compound is contacted with a halogenating agent and/or a titanium compound in the presence or absence of an electron donor, said halogenating agent being selected from the group consisting of a silicon halide, an aluminum halide and a halogen compound of phosphorus;

Sub-component (ii) which is a silicon compound represented by the formula:

wherein $R^1$ is a branched hydrocarbyl group of 3 to 20 carbon atoms whose α-carbon atom is secondary or tertiary, $R^2$ which may be the same or different from $R^1$, is a hydrocarbyl group of 1 to 4 carbon atoms, X is a halogen atom, and m and n are each numbers which satisfy the expressions:

$0 \leq m \leq 3, 0 \leq n \leq 3$ and $0 \leq (m+n) \leq 3$;

and

Sub-component (iii) which is an organoaluminum compound; wherein the Si/Ti atomic ratio of Sub-component (ii)/Sub-component (i) ranges from 0.1 to 100 and wherein the Al/Ti atomic ratio of Sub-component (iii)/Sub-component (i) ranges from 0.1 to 30; and Component (B), which is an organoaluminum compound represented by the formula: $R^3{}_{3-p}H_pAl$, wherein $R^3$ is a hydrocarbyl group of up to 5 carbon atoms and p is a number satisfying the expression $0 \leq p \leq 1$; the mole ratio of Al/Ti of Component (B) to Component (A) being 0.01 to 0.5.

2. The process as claimed in claim 1, wherein the polymerization temperature is within the range of 150° to 250° C.

3. The process as claimed in claim 1, wherein the Component (B) has the substituent $R^3$ which has up to 4 carbon atoms.

4. The process as claimed in claim 1, wherein the Component (B) is such that the p in the formula is zero.

5. The process as claimed in claim 1, wherein the silicon compound of Sub-component (ii) is such that the $R^1$ is a branched hydrocarbyl group of 4 to 10 carbon atoms whose α-carbon atom is tertiary.

* * * * *